Oct. 5, 1954  G. R. F. GAY ET AL  2,690,626
MAGNETICALLY GUIDED TOY

Filed March 2, 1949  2 Sheets-Sheet 1

INVENTORS
GODWIN R. F. GAY
CARL DOUGLAS HANELINE
By Kenway, Jenney, Witter
& Hildreth
ATTORNEYS Oct. 5, 1954 G. R. F. GAY ET AL 2,690,626
MAGNETICALLY GUIDED TOY
Filed March 2, 1949 2 Sheets-Sheet 2
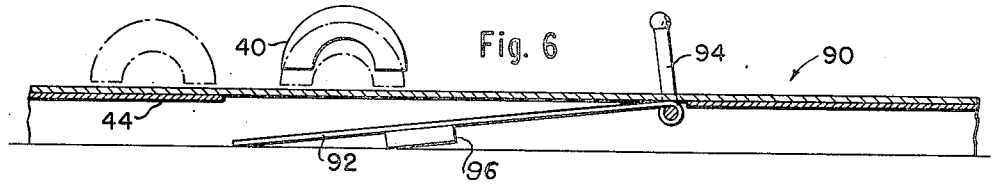
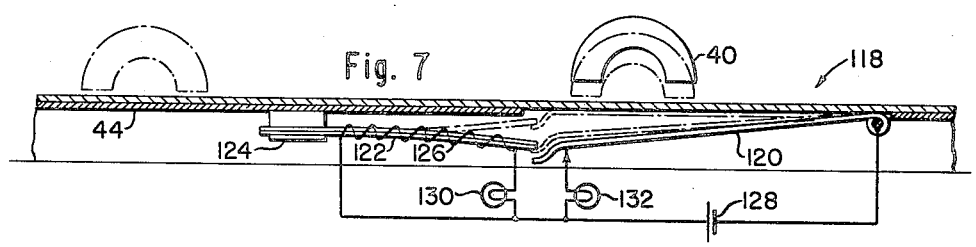
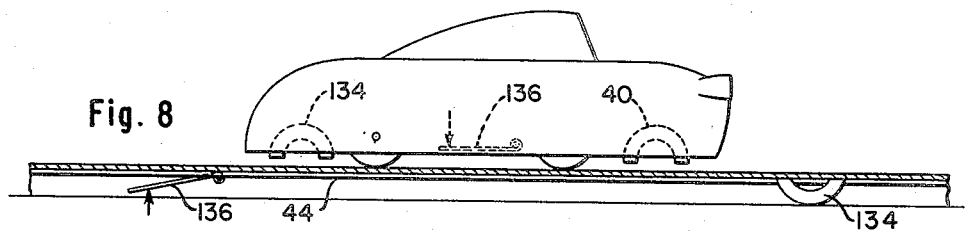
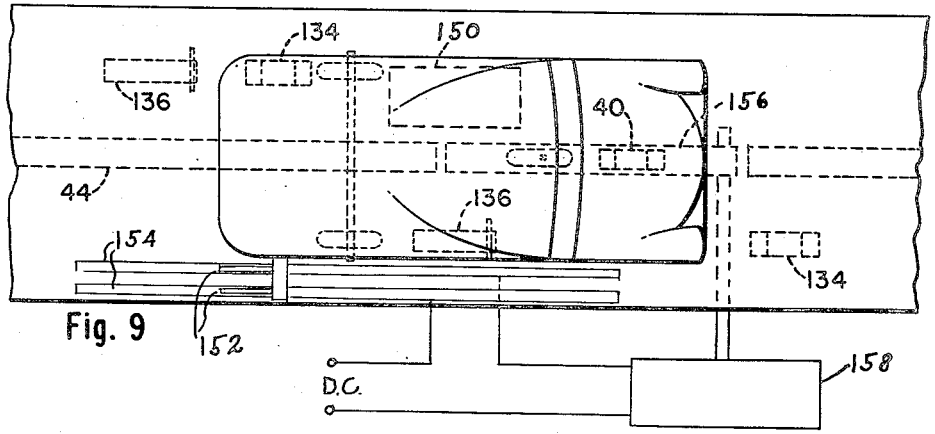
INVENTORS
GODWIN R. F. GAY
CARL DOUGLAS HANELINE
By Kenway, Jenney, Witter
& Hildreth
ATTORNEYS Patented Oct. 5, 1954

2,690,626

UNITED STATES PATENT OFFICE 2,690,626

MAGNETICALLY GUIDED TOY

Godwin R. F. Gay, Hudson, Mass., and Carl Douglas Haneline, Old Greenwich, Conn.

Application March 2, 1949, Serial No. 79,144

4 Claims. (Cl. 46—45)

The present invention relates to magnetically guided and controlled devices such as model vehicles, toys, display devices and the like, and is concerned more particularly, although by no means exclusively, with self-powered toys and models and with systems embodying the same, wherein the devices may be caused to operate along a predetermined path or course without visible guiding means.

One of the several objects of the invention is the provision of a propelled, dirigible device, which may be a toy, a model vehicle, or the like, the guidance of which is effected by magnetic means operating in spaced relation to a concealed guide strip.

Another object of the invention is to provide magnetic control means for a self-propelled model or vehicle, wherein not only the guidance but also the starting and stopping of the vehicle and other functions may be controlled by magnetic means without visible connection to the moving object.

In accordance with these and other objects, the invention is concerned with the provision of a toy or model vehicle which may advantageously be self-powered or propelled, wherein the guidance of the vehicle is effected by means of a magnet within the vehicle and associated with the dirigible wheel or wheels thereof so as to cause the vehicle to follow the course of an iron strip, rod, tape or the like, which strip or tape may be concealed beneath the surface of a support on which the vehicle may run with no visible means of guidance. Various forms of control may likewise be effected by magnetic means, as for example, stopping and starting, selection of any one of a choice of paths, automatic pauses at intersections, and the like, so as to provide a highly realistic simulation of motor vehicle operation along a highway.

Figure 1:
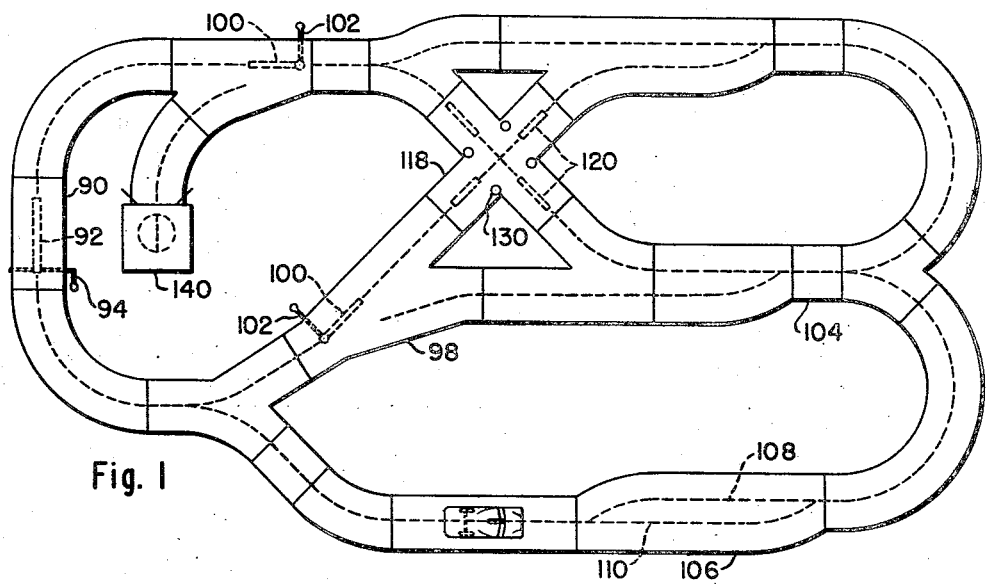
Figure 2:
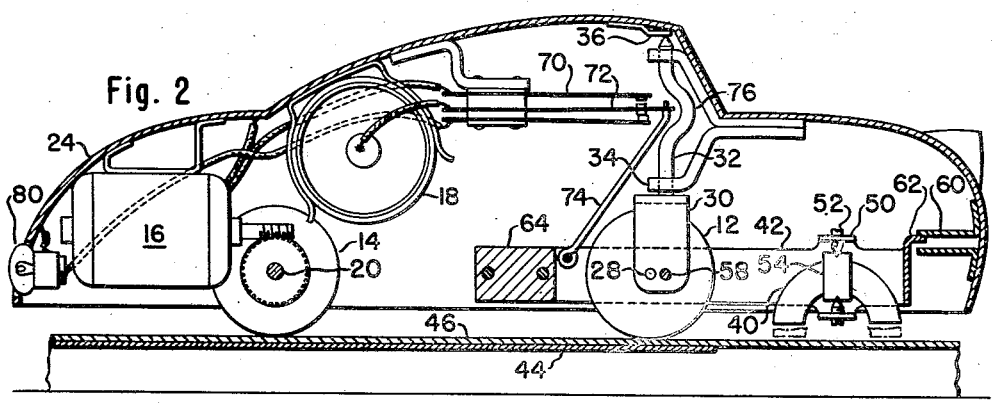
Figures 3, 4:
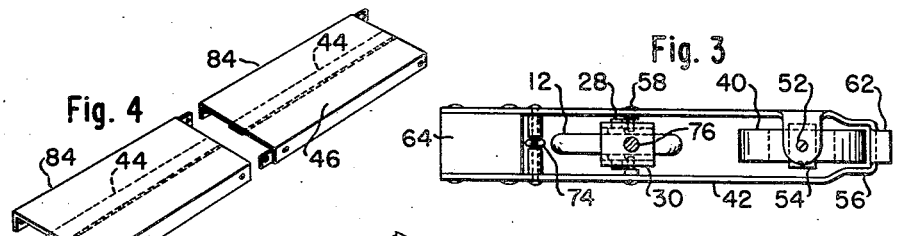
Figure 5:
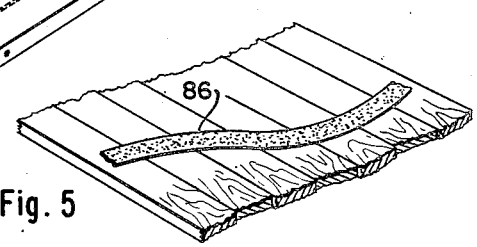

The several features of the invention may be embodied in a wide variety of forms and arrangements, and the several figures and accompanying description are therefore to be considered as illustrative rather than by way of limitation of the invention to the embodiment shown. In the drawings, Fig. 1 is a plan view of a typical highway layout for use with the toy vehicle, a number of different roadway elements being included to illustrate various types of control functions that are possible; Fig. 2 is a view in sectional elevation of a toy vehicle employing magnetic guiding and control elements; Fig. 3 is a top detail view of the steering unit of the vehicle; Fig. 4 is an oblique view of two sections, slightly separated, of roadway suitable for use with the vehicle; Fig. 5 is a view illustrating the use of flexible tape material to permit guiding the toy over a floor or table without the use of a roadway; Fig. 6 is a sectional view of a roadway section having manually actuated stop and start means for the toy; Fig. 7 is a similar view, showing automatic stop and start means, as at a stop light; and Figs. 8 and 9 illustrate the provision of auxiliary magnetic control elements, as for automatic control of associated devices upon the passage of the toy along the roadway.

The toy vehicle illustrated in Fig. 2 is of the three wheeled type, with a single steerable wheel 12 at the front (see Fig. 9) and two wheels 14 at the rear. The use of a single front wheel aids in reducing friction in steering. The vehicle may be propelled by any suitable means, although electrically-powered means lends itself particularly to simple control. In the illustrated embodiment, a small electric motor 16, powered by a dry-cell 18 of the flash light type is shown geared to the shaft 20 of the rear wheels. Preferably only one rear wheel is secured to the shaft, with the other wheel free to rotate thereon, in accordance with usual practice in wheeled toys.

The mechanism is preferably contained within a body 24 of any appropriate style or shape, resembling an automobile or other vehicle. The body will preferably be formed of lightweight material, such as plastic composition, to minimize the overall weight of the toy.

The guiding and control means which constitute a particular feature of the invention are associated with the steerable front wheel 12. This wheel is journalled on an axle 28 in a fork 30 secured to the lower end of a vertical shaft 32. The shaft 32 is pivoted in brackets 34 secured to the vehicle body, with turning friction minimized by pointing the tip of the shaft where it bears against a thrust plate 36. It will be observed that the wheel shaft lies slightly to the rear of the vertical steering axis to provide castor, thus tending to stabilize the wheel position on the centerline and minimize hunting.

The vehicle, during operation, is caused to follow a predetermined course through the action of a magnet 40 which is mounted ahead of the front wheel in a yoke 42 carried by the wheel fork 30. Guidance is provided for this purpose by means of an iron strip, wire, tape or the like, for example, a strip 44 of soft iron mounted beneath the surface of the roadway 46 on which the toy may run. By reason of the magnetic pull or attraction between the poles of the magnet and the soft iron strip, the magnet tends to align itself over the strip and thus cause the steerable wheel to follow closely the course of the strip.

In order to provide the maximum steering force for a given mass of magnet, it is preferable to employ a horseshoe type magnet, so supported that its poles are closely adjacent the iron guide strip 44. By keeping the air gaps small, and by employing as the magnet material an alloy of the aluminum-nickel-cobalt-iron type, frequently identified under the name "Alnico," the flux density in the gaps may be high, and the attractive force between magnet and guide strip therefore appreciable. In practice, this force acting through the leverage provided by the placement of the magnet forwardly of the steering axis, has been found fully adequate to enable the magnet to maintain itself in aligned relation to the strip as the vehicle advances, and thereby automatically steer the vehicle along the predetermined course without visible means of guidance.

To assist the magnet in maintaining itself in close alignment with the guide strip at all times, the magnet is mounted in the yoke for limited swinging movement about its own vertical axis. For this purpose, the yoke 42 may be provided with inwardly turned lugs 50 through which project pointed set screws 52. These pointed screws engage and seat in recesses in a band 54 embracing the body of the magnet to provide a freely-pivotal mounting. The swinging of the magnet is limited to a few degrees of arc by the sides 56 of the yoke 42 at the forward end.

In addition to its guiding function, the magnet may also be arranged to provide other control functions. For this purpose, the magnet is mounted for movement in a vertical direction toward and away from the guide strip. Referring to Figs. 2 and 3, it will be seen that the yoke 42 is pivotally connected to the arms of the wheel fork by stub shafts or pins 58. Vertical movement of the magnet is limited to a range of approximately 1/64" through the provision of stops 60, between which a tongue 62 projects from the forward end of the yoke 42. A counterweight 64 at the rear of the yoke serves to balance the yoke assembly so that the magnet may respond with vertical movement to small differences in attractive force.

Rocking movement of the yoke is arranged to control the starting and stopping of the vehicle through the provision of a switch indicated generally at 70 and having a movable switch arm 72. The latter is mechanically connected by a diagonal link 74 to the yoke 42, the connection from the link to the switch arm being centered on the steering axis of the front wheel to avoid change of switch position during steering. For this purpose the shaft 32 is offset at 76 to provide clearance for the axially aligned connection from link to switch arm.

The spring tension of the switch arm is adjusted to hold the lower set of contacts closed and at the same time maintain the magnet in raised position, in the absence of any guide strip below and within the normal operating range of the magnet, as shown in Fig. 2. In the presence of the iron guide strip beneath the roadway surface, however, the attractive force is sufficient to overcome the slight force of the switch arm, and the magnet is drawn downwardly to the position shown in dotted line. In this position, the upper set of switch contacts will be closed, thereby completing the circuit between battery and motor to set the vehicle in operation. Thus, so long as a guide strip is present beneath the roadway, the toy vehicle will propel itself by its battery-driven motor, with the steering of the vehicle effected automatically and without visible means, through the force of attraction between magnet and guide strip. Upon reaching the end of the strip, the magnet will be raised to its upper position, interrupting the motor circuit and bringing the vehicle to a halt. If desired, the circuit through the now-closed lower set of switch contacts may be used to light a small incandescent lamp 80 at the rear of the vehicle to simulate a motor vehicle stop light.

The toy vehicle is adapted to operate on a roadway which may be constructed and arranged in a wide variety of ways. One form of roadway construction is shown in Fig. 4, wherein sections 84 may be joined together to form an extended, slightly elevated roadway surface having the soft iron guide strip 44 beneath the roadway surface. These roadway sections may be made in straight and curved sections, and with intersections, cross-overs, and switch sections to permit a wide variety of layouts and arrangements, of which Fig. 1 is merely an example.

Alternatively, a guide strip for the vehicle may be provided by means of a flexible iron tape, or a non-metallic tape containing iron powder, which may be adhesively secured to the surface of a floor or table top, to provide a guide which the toy will effectively follow. Such a tape is illustrated at 86 in Fig. 5.

In the roadway layout of Fig. 1, a number of special roadway sections are shown for purposes of illustration of the different types of control possible in a toy vehicle system utilizing a magnetically guided toy such as shown in Fig. 2. For example, stop and start means may be provided, as at 90, and more fully illustrated in Fig. 6.

For this purpose, a section 92 of the guide strip 44 is arranged for raising and lowering movement beneath the roadway surface, as by hinging at one end under the control of a lever arm 94 at the side of the roadway. With the strip lowered, as shown, the attractive force between strip and magnet when the vehicle magnet 40 arrives over the region is inadequate to hold the magnet in lowered position, shown by dotted line. The magnet therefore lifts, under the influence of spring arm 72, to its raised position, breaking the motor circuit and stopping the vehicle.

If, with the car at rest in the region over the pivoted strip, the strip is now raised by lever 94 to its upper position, into operative range of the magnet, the latter will be drawn down completing the motor circuit and causing the car to start.

By providing a weight 96 of suitable size, attached to the movable guide strip section 92, the stop section may be made effective for cars approaching from one direction only. Thus, a car coming from the left may be brought to a stop by the depressed guide strip section, but a car coming from the right or hinge end of the strip, may proceed without stopping. This result occurs because, in the case of the car approaching from the hinge end of the strip, there is no abrupt break in the magnetic relation between magnet and strip such as occurs when a car approaches from the direction of the lowered end.

Selection of the path the car is to take at a fork is effected by a switch section 98, wherein a movable guide strip section 100 is pivoted on a vertical axis so that the strip can be moved by handle 102 into alignment with one or the other of the fixed guide strips of the Y. Alternately, a Y section may be provided, as at 104, without a movable strip, so that the vehicle may select at random either one fork or the other when the guide magnet arrives at the point where the guide strip branches.

In lieu of a symmetrical Y, with random selection of path, a non-symmetrical layout may be provided to afford a passing section, where vehicles may meet and pass one another. Such a section is shown at 106, wherein parallel guide strips 108 and 110 are provided. The strip 108 has a straight entrance from the right hand, the strip 110 a straight entrance from the left, with the result that a car coming from the left will always select the path represented by strip 110, while a car coming from the right will proceed along strip 108, the cars proceeding along their separate strips until guided by the curved terminations onto the normal single strip.

Automatic stop and start control at an intersection or crossing 118 may likewise be provided in simulation of the control of motor vehicle traffic at a stop light, such control operating in conjunction with the guide magnet within the vehicle. As shown in Fig. 7, a vertically movable hinged guide strip section is provided at 120. In addition, a bi-metallic strip 122 is provided, secured at one end to a block of insulating material 124. A heating coil 126 is arranged in association with the bi-metal strip, and a source of current provided by a battery 128 or other suitable means.

The operation of this unit is as follows: In the absence of the vehicle, the guide strip rests in lowered position, shown in full line. Upon the approach of the car, the strip is drawn upwardly by the pull of the magnet 40, into engagement with the free end of the bi-metal element 122. This element, in its cooled condition, prevents the guide strip from lifting to its fully raised position. As a result, the magnet lifts from its running position and the car stops, through interruption of the motor circuit.

The raising of the guide strip 120 into contact with the bimetal element serves to close the circuit through the heating coil with the result that the bi-metal element is warmed, causing it after an interval to bend to the position shown in dotted outline. This permits the movable guide strip to approach the magnet 40, with the result that the magnet is now drawn down, completing the motor circuit and causing the car to start and move on. If desired, small incandescent lamps 130 and 132 may be connected as shown so that a red lamp may be lighted as the car approaches and comes to halt, and a green light displayed after the thermal delay element or bi-metal strip has released the guide strip 120. If the intersecting ways are each provided with the automatic stop and start means, and a plurality of vehicles are to run on the roadway, the several movable guide strips 120 may be so interlocked by suitable connections that but one strip at a time can be in "go" position, thereby insuring against collision at the intersection.

It will be apparent that various other control functions may be provided. Figs. 8 and 9 illustrate the use of auxiliary magnets 134, in either the vehicle or in the roadway, but disposed to one side of the guide strip and magnet, to actuate independent magnetic elements 136 upon passage of the vehicle. Movement of the elements 136 may serve to open or close or otherwise control the motor circuit of the vehicle, instead of using the steering magnet, or to control electrical circuits or devices, either within the vehicle or externally thereof, such as to open automatically the doors of a garage 140.

In case it is desired to provide for substantially continuous operation over long periods of time, as where the system is employed for display purposes, the vehicle may be provided with a battery of the rechargeable type, with provision for periodic automatic recharging. Such an arrangement is illustrated in Fig. 9, wherein a small storage battery, indicated at 150, is carried within the car body to power the driving motor. To recharge the battery, the vehicle is provided with contact shoes or brushes 152, shown as mounted alongside the car for purposes of illustration but preferably mounted beneath the car, the brushes being electrically connected to the terminals of the battery. The brushes are normally out of contact with the roadway or surface over which the vehicle operates.

Connection is made to the shoes 152 by means of rails 154 arranged in the path of the brushes at one or more regions of the roadway system. Alternatively, these charging rails could be provided within a garage or other structure into which the vehicle might be run at intervals. In the illustrative arrangement, the vehicle is caused to stop, when it arrives at the charging section, by a displaceable guide section 156 similar to element 92 of Fig. 6. When so stopped, the brushes contact the rails, which are connected to a suitable source of direct current, not shown. A timer indicated generally at 158 may be arranged to provide a predetermined dwell for the vehicle at the charging station, and to apply charging current to the rails during that period. At the end of the period, the track section 156 may be raised to start the car in the manner already described. The control functions provided by elements 134, 136 upon passage of the car may be utilized to initiate the charging and timing cycle when the car arrives.

This arrangement of rails and pick-up brushes may also be adapted for other functions, as for applying additional current to the motor to provide increased power or car speed at predetermined regions of the roadway.

Because of the accurate guidance provided by the guide magnet and guiding strip, it is possible to have several guide strips arranged alongside one another in fairly close relation, without the car losing its proper course. As a result, an extended path or course may be provided by doubling back the guide strip, or arranging the guide strip in the general form of a spiral, with the car returning to the starting point by carrying the guide strip across the other paths at a substantial angle.

It will be understood that the foregoing description of the model vehicle and associated roadway and roadway elements is by way of illustration merely, since the invention is by no means limited to the precise embodiments shown and described but comprehends a wide variety of constructions and arrangements, both of vehicle and auxiliary components, within the scope of the appended claims.

Having thus described the invention, we claim:

1. A vehicle system comprising a self-propelled dirigible vehicle having an electrical circuit in control of vehicle propulsion, steering means for said vehicle comprising a laterally movable member, a magnet mounted thereon with its poles in closely spaced relation to the surface over which the vehicle operates, the member being mounted for limited vertical movement toward and away from said surface, guiding means comprising an elongated strip of magnetic material associated with the surface over which the vehicle operates for guiding the vehicle along the path of said strip by the attraction between the magnet and the strip, and a switch actuated by vertical movement of the magnet-supporting member for interrupting the electrical circuit to stop the vehicle in the absence of the guide strip beneath the magnet.

2. A vehicle system comprising a self-propelled vehicle, an electrical circuit including a switch within the vehicle for controlling the operation of the propelling means, a steering member, a magnet carried by said member, said magnet being laterally movable to steer the vehicle, means supporting the magnet for limited vertical movement, connections actuated by vertical movement, of the magnet for operating the switch in control of vehicle propulsion, the switch being closed to actuate the propelling means when the magnet is in lowered position and open to stop the vehicle when the magnet is in raised position, a roadway over which the vehicle operates, and guiding means comprising a strip of magnetic material extending along the roadway in association with the surface thereof to cause the vehicle to follow the path of the strip with the magnet held by its attractive force in lowered position in closely spaced relation to the guide strip, said guiding strip including a section displaceable downwardly out of the normal operative range of the magnet whereby, when the vehicle arrives at the region of the downwardly displaceable section, the magnet moves to raised position to open the switch and stop the vehicle.

3. A vehicle system comprising a roadway having a guiding means, the guiding means consisting of a strip of magnetic material associated with the roadway surface, said strip being sufficiently long to define a path of extended movement along the strip, and a magnetically guided vehicle having, in combination, electrically-actuated propulsion means, a steerable element, a magnet carried by said element forwardly of the steering axis thereof, said magnet being mounted for limited vertical movement relative to the plane of operation of the vehicle, and switch means responsive to vertical movement of the magnet to control the operation of the propulsion means, said magnet and strip being so relatively positioned that the attractive force between them maintains the magnet over the strip while the vehicle progresses along the path of the strip so that a variation in the flux linkage between the magnet and the strip causes a vertical movement of the magnet.

4. A vehicle system comprising a roadway having a guiding means, the guiding means consisting of a strip of magnetic material associated with the roadway surface said strip being sufficiently long to define a path of extended movement along the strip, and a magnetically guided vehicle having in combination, means for propelling the vehicle, a steering element, a lever arm connected with the steering element, a magnet mounted in said arm forwardly of the steering axis, said magnet being flux-linked to the strip and mounted for limited rotational movement in said arm about a substantially vertical axis, and mounted for limited vertical movement in spaced relation toward and from the surface upon which the vehicle is adapted to operate in response to interruptions in the flux linkage between the magnet and the elongated strip, and a switch responsive to vertical movements of the magnet to control the propelling means.

References Cited in the file of this patent

UNITED STATES PATENTS

| Number | Name | Date |
|---|---|---|
| 1,497,382 | Rollason | June 10, 1924 |
| 1,824,214 | Key | Sept. 22, 1931 |
| 1,856,991 | Franklin | May 3, 1932 |
| 1,868,313 | Daubendiek | July 19, 1932 |
| 1,967,524 | Allen | July 24, 1934 |
| 2,026,181 | Kennedy | Dec. 31, 1935 |
| 2,068,403 | Ekstrom | Jan. 19, 1937 |
| 2,074,251 | Braun | Mar. 16, 1937 |
| 2,254,967 | Larkins | Sept. 2, 1941 |
| 2,317,400 | Paulus et al. | Apr. 27, 1943 |
| 2,444,961 | Smith | July 13, 1948 |
| 2,618,888 | Hoff | Nov. 25, 1952 |

FOREIGN PATENTS

| Number | Country | Date |
|---|---|---|
| 36,742 | France | Apr. 15, 1930 |